United States Patent [19]

Takasu et al.

[11] 4,453,521

[45] Jun. 12, 1984

[54] METHOD AND APPARATUS FOR CONTROLLING IGNITION TIMING IN A MULTICYLINDER INTERNAL COMBUSTION ENGINE

[75] Inventors: Yasuhito Takasu, Toyohashi; Shingo Inoue, Anjo; Toshiharu Iwata, Aichi, all of Japan

[73] Assignee: Nippondenso Co., Ltd., Kariya, Japan

[21] Appl. No.: 481,234

[22] Filed: Apr. 1, 1983

[30] Foreign Application Priority Data

Apr. 2, 1982 [JP] Japan .................................. 57-55695
Apr. 6, 1982 [JP] Japan .................................. 57-56935

[51] Int. Cl.³ .............................................. F02B 5/04
[52] U.S. Cl. ..................................... 123/419; 123/417
[58] Field of Search ................ 123/419, 417, 436, 406

[56] References Cited

U.S. PATENT DOCUMENTS

| | | | |
|---|---|---|---|
| 3,596,643 | 8/1971 | Schweitzer | 123/419 |
| 4,026,251 | 5/1977 | Schweitzer | 123/419 |
| 4,379,333 | 4/1983 | Ninomiya | 364/431.05 |
| 4,389,992 | 6/1983 | Shigematsu | 123/419 |

*Primary Examiner*—Ronald B. Cox
*Attorney, Agent, or Firm*—Cushman, Darby & Cushman

[57] ABSTRACT

Engine parameters are detected to set a basic ignition timing, and this basic ignition timing is forcibly changed to effect feedback control in which engine output is detected for finding an optimum combination of ignition timings of the individual cylinders. Engine is operated with a plurality of different ignition timing combinations, where the number of the combinations equals the number of the cylinders added by one. The engine is further operated with one of the ignition timing combination so that the engine is operated twice with an identical ignition timing combination. As a result engine output change caused by factors other than ignition timing change is detected. Thus, one of a plurality of ignition timing combinations, which gives the lowest engine speed only because of the change in ignition timing is found and is replaced with a new ignition timing combination with which the engine produces higher output. The replacement is carried out selectively in accordance with the variation in engine output data resulted from various ignition timing combinations. An average value of various ignition timing combinations is used to renew the same. In this way the ignition timing combination is renewed successively for finding the optimum ignition timing combination.

14 Claims, 14 Drawing Figures

(a) #1 CYLINDER IGNITION TIMING
(b) #2 CYLINDER IGNITION TIMING
(c) ENGINE SPEED
(d) ENGINE SPEED MEASURING CLOCK PULSE
(e) IGNITION SIGNAL

METHOD AND APPARATUS FOR CONTROLLING IGNITION TIMING IN A MULTICYLINDER INTERNAL COMBUSTION ENGINE

BACKGROUND OF THE INVENTION

This application is related to Co-pending U.S. application Ser. No. 403,816 filed on July 30, 1982 assigned to Nippondenso Co., Ltd.

This invention relates generally to ignition timing control in a multicylinder internal combustion engine of a vehicle or the like, and more particularly the present invention relates to method and apparatus for controlling ignition timing for each cylinder so that ignition timing in each cylinder is optimum to obtain the highest engine output.

In an internal combustion engine, the ignition timing is generally determined so that engine output is maximum and fuel consumption is minimum from engine parameters such as engine rotational speed and intake pressure or intake airflow. However, an ignition timing determined in this way is not necessarily ideal throughout all the cylinders in a multicylinder engine because of variations or difference among individual cylinders, existing from the time of manufacturing or caused by secular change. Therefore, when a given ignition timing is set for all the cylinders commonly, the resultant engine output sometimes cannot be high enough as expected when ideal or optimum ignition timing is respectively set for individual cylinders.

SUMMARY OF THE INVENTION

The present invention has been developed in order to remove the above-described drawbacks inherent to the conventional method and apparatus for controlling ignition timing in a multicylinder internal combustion engine.

It is, therefore, an object of the present invention to provide a method and apparatus with which ignition timing of each cylinder is selected so that resultant engine output is maximum. Especially, the object of the present invention is to provide such a method and apparatus which provide an optimum ignition timing combination with high stability irrespective of changes in various factors, such as fuel flow rate caused by operation of the accelerator pedal or the like.

In order to find a combination of optimum ignition timings of all the cylinders, ignition timing or its correction amount for each cylinder is forcibly changed to effect feedback control in which engine output is detected. Engine is operated with a plurality of different ignition timing combinations, where the number of the combinations equals the number of the cylinders added by one. Average value of various ignition timings in the plurality of combinations is calculated, and one of the combination giving the lowest engine output only because of the change in ignition timing is detected. A new ignition timing combination is set so that engine output increases, and the combination giving the lowest engine output only because of the change in ignition timing is replaced by the new combination so that a new set of the plurality of ignition timing combinations is provided.

According to a feature of the present invention the engine is operated twice with an idential ignition timing combination with a time difference therebetween so that it can be determined whether engine output data, such as the engine speed, is changed by factors other than a change in ignition timing or not. Since engine output data obtained when the engine is operated with a plurality of ignition timing combinations cannot be simply compared with each other to determine which ignition timing gives the highest engine output because each engine output data may include a component caused by the change in factors other than ignition timing, a net change which is resulted only because of the change in ignition timing is derived by using the difference in engine output data obtained by engine operation in twice with the identical ignition timing combination. In this way a net or substantial change, which will be described as difference or deviation in the following description, is found for each engine output data, and then a value indicative of the variation in a plurality of net change amounts is derived. This value will be compared with a predetermined value to determine whether one of the ignition timing combinations giving the lowest engine output only because of the change in ignition timing is to be replaced with a new ignition timing combination which will give a higher engine output. In this way the ignition timing combination is renewed successively for finding an optimum ignition timing combination.

In one embodiment of the present invention, such replacement or renewal is carried out only when a value indicative of the variation in engine output data caused by the change in ignition timing, is greater than or equal to a predetermined value so that ignition timing combination is prevented from being undesirably changed when ignition timing combination has already approached to an optimum point.

In a modification of the present invnention, such replacement or renewal is carried out only when a value indicative of the variation in engine output data caused by the change in ignition timing, is smaller than or equal to a predetermined value so that ignition timing combination is prevented from being undesirably changed by external disturbance applied to the engine. Namely, ignition timing combinations are not replaced with a new one when it has been detected from the above-mentioned value indicative of the variation in a plurality of net change amounts that the engine output data drastically changes.

In accordance with the present invention there is provided a method of controlling ignition timing in a multicylinder internal combustion engine, comprising the steps of: (a) operating the engine with a plurality of combinations of ignition timings of respective cylinders to derive engine output data for each combination in such a manner that the engine is operated for a predetermined period of time with each of the combinations one after another; (b) further operating the engine with one of the combinations again for a predetermined period of time to derive further engine output data; (c) deriving the difference between the engine output data both obtained from engine operation in twice with an identical ignition timing combination; (d) deriving, by using the difference obtained in the step (c), imaginary engine output data which would have been obtained if the engine were operated with the identical ignition timing combination with which the engine has been operated twice; (e) deriving the difference between each imaginary engine output data obtained in the step (d) and each engine output data obtained in the step (a); (f) deriving a value indicative of the variation throughout the differences obtained in the step (e); (g) comparing the value obtained in the step (f) with a predetermined value; (h) replacing the ignition timing combination, which gives the largest negative difference or the lowest engine output in the case that all the differences are positive, with a new ignition timing combination when the value has a predetermined relationship with the predetermined value; and (i) determining a subsequent ignition timing by using one of the plurality of ignition timings when the value does not have the predetermined relationship with the predetermined value.

In accordance with the present invention there is also provided apparatus for controlling ignition timing in a multicylinder internal combustion engine, comprising: (a) first means for producing ignition signals which are respectively fed to spark plugs of the engine cylinders, the first means being capable of producing the ignition signals having different timings from another; (b) second means for detecting the engine output; (c) third means for detecting engine parameters; and (d) fourth means responsive to the second and third means for causing the first means to produce the ignition signals, the fourth means; determining a basic ignition timing in view of the engine parameters; changing the basic ignition timing so that various combinations of ignition timings are provided for operating the engine with the various ingition timing combinations in such a manner that the engine is operated twice with an identical ignition timing combination; deriving the difference between the engine output data both obtained from engine operation in twice with the identical ignition timing combination; deriving, by using the difference, imaginary engine output data which would have been obtained if the engine were operated with the identical ignition timing combination with which the engine has been operated twice; deriving the difference between each imaginary engine output and each engine output data actually measured; deriving a value indicative of the variation throughout the differences each between imaginary enine output data and actually measured data; comparing the value with a predetermined value; replacing the ignition timing combination, which gives the largest negative difference or the lowest engine output in the case that all the differences are positive, with a new ignition timing combination when the value has a predetermined relationship with the predetermined value; and determining a subsequent ignition timing by using one of the plurality of ignition timings when the value does not have the predetermined relationship with the predetermined value.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, the principle or concept of the invention, namely, the way of finding an optimum combination of ignition timings of individual cylinders will be described with reference to FIGS. 1, 2 and 3.

Figure 1:
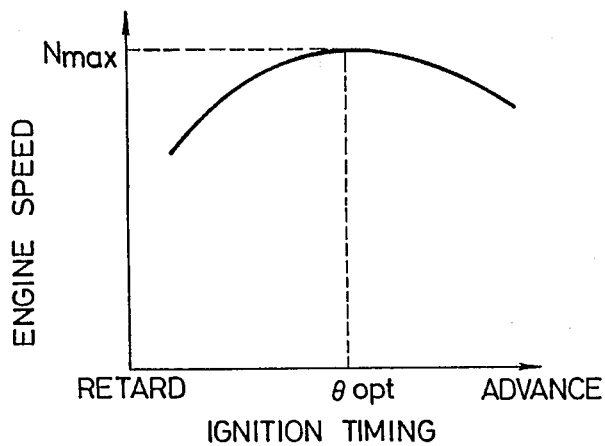
FIG. 1 is a graph showing the relationship between ignition timing and engine rotational speed.

FIG. 1 shows the general relationship between the ignition timing expressed in terms of an advance angle, and an engine rotational speed in a single cylinder engine. As will be understood from FIG. 1, the curve has a peak point showing the maximum engine speed Nmax. An ignition timing providing the maximum engine speed Nmax is referred to as an optimum ignition timing or peak point $\theta_{opt}$. In other words, the ignition timing should be set to the optimum value $\theta_{opt}$ to obtain the highest engine speed Nmax or output. However, in a multicylinder engine, the relationship between the ignition timing and engine speed is not simple as shown in FIG. 1 because the optimum ignition timing $\theta_{opt}$ is not necessarily common to all the cylinders.

Figure 2:
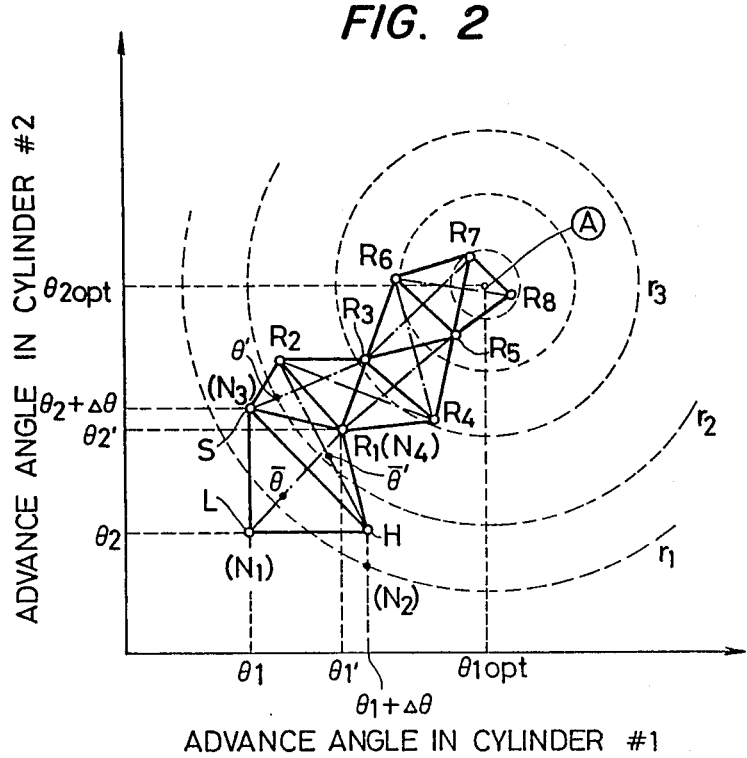
FIG. 2 is an explanatory diagram in the form of an engine speed contour map, showing the fundamental method of finding an optimum combination of two igntion timings for a two-cylinder engine.

This point will be described with reference to FIG. 2 showing an engine speed contour map. Taking an example of a two-cylinder engine for simplicity, it is assumed that the two-cylinder engine exhibits the maximum output or engine speed when each ignition timing at each cylinder is set to its optimum value $\theta_{1opt}$ and $\theta_{2opt}$. The references #1 and #2 respectively indicate the first and second cylinders, and the advance angle of the first cylinder #1 is plotted along the x-distance, while the advance angle of the second cylinder #2 is plotted along the y-distance. A point "A" at the center of the contour map indicates a combination of the optimum ingnition timings $\theta_{1opt}$ and $\theta_{2opt}$, and another point $\theta_B$ corresponding to the origin of the co-ordinates indicates a combination of initial ignition timings in which the ignition timings of the first and second cylinders #1 and #2 are equal to each other. Dotted coaxial circular lines r1, r2, r3 . . . indicate contour of engine speed which varies as the ignition timing of one or both of the first and second cylinders #1 and #2 changes. The point "A" which may be referred to as an optimum timing combination point, is a point where the engine speed is the maximum as described in the above, and this means maximum torque can be obtained when the engine operates under such condition.

Now, the way or technique of finding this optimum timing combination point "A" will be described. In FIG. 2, it is assumed that the ignition timing of the first cylinder #1 is expressed by $\theta_1$ and the ignition timing of the second cylinder #2 by $\theta_2$. A point "L" indicates the combination of the ignition timings $\theta_1$ and $\theta_2$, and it is also assumed that the engine operates at a speed N1 with such an ignition timing combination for a given period of time, such as a period corresponding to a given number of rotations such as 20 revolutions. The advance angles plotted along the x and y distances are correction amounts or angles which are added to the basic ignition timing $\theta_B$. Namely, as described in the above, the origin of the co-ordinate does not equal zero but equals this basic ignition timing $\theta_B$, and the amounts or angles along the x and y distances are correction amounts to be added to the basic ignition timing $\theta_B$.

After the engine has been operated under the condition of the ignition timing combination of the point L, the ignition timing of the first and/or the second cylinder #1 and #2 is changed. As the result, the engine operates at a speed N2. For instance, the ignition timing $\theta_1$ of the first cylinder #1 is changed to $\theta_1 + \Delta\theta$, while the ignition timing $\theta_2$ of the second cylinder #2 is maintained at $\theta_2$. The new combination ($\theta_1 + \Delta\theta$, $\theta_2$) is at a point H. After the engine has been operated under this condition, i.e. with the ignition timining combination H, for a given period of time, the ignition timing is further changed to a point S where the ignition timing of the first cylinder #1 is returned to $\theta_1$, and the ignition timing of the second cylinder #2 is changed to $\theta_2 + \Delta\theta$. The engine is operated at this point S ($\theta_1$, $\theta_2 + \Delta\theta$) for a given period of time, and the engine speed obtained when the engine is in this condition is expressed in terms of N3. After the engine operation under the point S, the engine is again operated under the first point L. The engine speed resulted when operated under the point S, however, does not necessarily equal N1 due to changes in various factors. For instance, if the accelerator pedal has been moved to change the flow rate of fuel supplied to the engine, the engine speed under point L may be deviated from N1 which is also resulted under point L. This new engine speed obtained as the result of engine operation again under the point L, is expressed in terms of N1'.

The above-described ignition timing changing will be understood from the following TABLE.

TABLE

| CYLINDER | IGNITION TIMING | | | | AVERAGE |
| --- | --- | --- | --- | --- | --- |
| #1 | $\theta_1$ | $\theta_1 + \Delta\theta$ | $\theta_1$ | $\theta_1$ | $\theta_1 + \Delta\theta/3$ |
| #2 | $\theta_2$ | $\theta_2$ | $\theta_2 + \Delta\theta$ | $\theta_2$ | $\theta_2 + \Delta\theta/3$ |
| ENGINE SPEED | N1 | N2 | N3 | N1' | |
| POINT ON FIG. 2 | L | H | S | L | |

Among these four combinations, the first three combinations, i.e. three from the left in the above TABLE, are used to find an average angle combination $\bar{\theta}$ which is an intersection of an average angle $\theta_1 + \Delta\theta/3$ for the first cylinder #1 and another average angle $\theta_2 + \Delta\theta/3$. The reason that the number of combinations is three is that the number of cylinders has been assumed as two. Namely, the number of combinations used to find the average angle equals 1 plus the number of cylinders of an engine to be controlled.

The above-mentioned three different combinations of ignition timings and four different engine speed data will be used to find the aforementioned optimum combination "A" in the following manner. It is detected which point gives the lowest engine speed among these three combinations due to the difference in ignition timing only. In the illustrated example, the combiantion or point L giving the lowest engine speed will be found.

In order to find the combination giving the lowest engine speed only because of the change in ignition timing, the engine is operated four times under three ignition timing combinations as shown in TABLE. Namely, the engine is operated twice under the identical combination L with a given time interval and also under the combinations H and S. The difference in engine speed data N1 and N1' respectively obtained from the two operations under the identical combination L are considered to be caused by factors other than ignition timing change because ignition timing per se is not changed. Namely, the change between N1 and N1' is caused by some reasons, such as the change in flow rate of fuel resulted from the operation of the accelerator pedal. The state of this change from N1 to N1' is assumed that the engine speed has been linearly changed in proportion to time. Unless the difference between N1 and N1' is zero, the engine speed data N2 and N3 (points H and S) already obtained include a component caused by the change in factors other than ignition timing. This means that the engine speed data N2 and N3 cannot be simply compared with the engine speed data N1, and therefore, N2 and N3 have to be corrected in view of the difference between N1 and N1' before comparison. The lowest or minimum engine speed data caused by only the change in ignition timing will also be simply expressed as the lowest or minimum engine speed data hereafter.

In order to correct N2 and N3, therefore, a component included in each of N2 and N3, which component is caused from the accelerator operation, is calculated by interpolation, using the difference between N1 and N1', and time difference therebetween. Namely, engine speed data, which would have been resulted at the time N2 and N3 were measured if the ignition timing combination had not been changed, are obtained first. These engine speed data obtained by interpolation are referred to as imaginary engine speed data. Then the difference between each imaginary engine speed and an actual engine speed, i.e. N2 and N3 in this case, are computed to find the substantial deviations caused by only the change in ignition timing. In other words, the above-mentioned components caused by the change in factors other than ignition timing are removed from the actually measured engine speed data. Since each difference is computed by subtracting an imaginary engine speed from a corresponding actually measured engine speed, if the former is greater than the latter, the difference assumes a positive value, and on the other hand if the former is smaller than the latter, the difference assumes a negative value. In this way each difference or deviation is computed.

After this, a value indicative of the variation throughout these differences is obtained. This value may be a sum of absolute values of these differences. When this value is greater than a predetermined value, namely when the variations are large, a combiantion of ignition timings which gives the lowest engine speed only because of the ignition timing change, is obtained from the comparison between these differences. In the illustrated example, the combination L is one which gives the lowest engine speed.

Then a point $\bar{\theta}$ indicating the combination of the above-mentioned first and second average ignition timings $\theta_1+\Delta\theta/3$ and $\theta_2+\Delta\theta/3$ is marked, and a line passing through the points $\bar{\theta}$ and L is drawn (see the dot-dash line between points $\bar{\theta}$ and L). This dot-dash straight line is extended in a direction from the point L beyond the point $\bar{\theta}$, and a new point R1 is set on this dot dash line at a point opposite to the point L with respect to the point $\bar{\theta}$. Namely, this new point R1 is set so that it is closer to the optimum combination point "A" than the point L.

The first and second ignition timings defined by this new point or combination R1 are respectively calculated, and the engine is operated with this new combination R1 of the first and second ignition timings. The engine speed with this new ignition timing combination R1 is put as N4, where N4>N1. Furthermore, the engine is operated with the combination H again so that another engine speed data N2' is obtained. The minimum engine speed N1 is then replaced with the engine speed N4, and the difference between N2 and N2' is obtained. This difference will be used to obtain imaginary engine speeds, which would have been obtained at the time that N2 and N3 were obtained if the engine was operated under the combination H, where the engine speed is changing at a given rate indicated by the difference between N2 and N2'. Namely, these engine speeds are respectively obtained by interpolation in the same manner as in the above. These engine speeds obtained by interpolation are used to derive deviations from the actually measured engine speeds N2 and N3. Then a combination, which gives the lowest engine speed, i.e. H giving N2 in the illustration, among the three rotational speeds only because of the influence of ignition timing, is found. An average ignition timing of the three points H, S and R1 is calculated for each cylinder. The combination of the average ignition timings is shown by a point $\bar{\theta}'$, and a line passing through the point $\bar{\theta}'$ and the lowest engine speed point H is drawn (see the dot-dash line passing these points). This dot-dash line is extended in a direction from the point H to the point $\bar{\theta}'$ beyond the point $\bar{\theta}'$ so that a further new point R2 is set on this line at a point opposite to the point H with respect to the point $\bar{\theta}'$. Namely, this new point R2 is set so that the engine speed obtained thereby is higher than that of the point H.

The above-mentioned operations are repeated to find a new combination successively. In other words, the combination of the ignition timings is changed or corrected as R1→R2→R3→R4→R5→R6→R7→R8 in a direction of the engine speed increase. Since the engine speed obtained by a new combination of ignition timings is higher than the engine speed by the old combination, repetition of the above steps results in convergence of the engine speed toward the optimum combination or point "A". In this way the optimum ignition timing combination "A" can be found.

The above operation is directed to a case in which the sum of absolute values of the differences is continuously greater than the predetermined value during the process of finding the point "A".

If the the sum of absolute values of the differences is samller than the predetermined value, the data [($\theta_1$, $\theta_2$), N1']which is resulted from the operation in twice is substituted for the data [($\theta_1$, $\theta_2$), N1], and the ignition timing combination for the oldest data among stored data is used so that the engine is operated with such a combination. Namely, the engine is operated with the combination H, which is the second combination from the left in the TABLE. As a result, a new engine speed N2' is obtained and operations same as the above are repeated. With this method, when the aforementiond predetermined value, with which the sum of absolute values of the differences is compared, is suitably set, correction of ignition timing is always effected in a right direction so that stable ignition timing control can be actualized.

Figure 3:
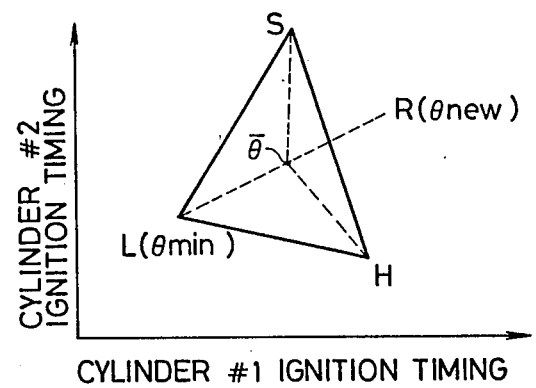
FIG. 3 is an explanatory diagram showing the way of determining a new combination of ignition timings for increasing the engine speed from a plurality of ignition timing combinations whose number is larger than the number of cylinders by one.

FIG. 3 illustrates the way of finding a new combination point from the original three points H, S and L. The new point is denoted by $\theta_{new}$, which corresponds to the point R1 in FIG. 2. The average ignition timing $\bar{\theta}$ is given by the following vector expression:

$$\bar{\theta} = \frac{H + S + L}{3} \tag{1}$$

Assuming that the new combination point substituting for the old combination point $\theta_{min}$ (point L), which gives the largest negative difference, is expressed by $\theta_{new}$, this new combination is given by:

$$\theta_{new} = \bar{\theta} - \alpha(\theta_{min} - \bar{\theta}) \tag{2}$$

wherein $\alpha$ is a constant.

Although the above description is directed to a two-cylinder engine for simplicity, the ignition timing control in a larger number cylinder engine can be effected with the same principle as the above for controlling ignition timings of respective cylinders and maximizing engine speed.

Figure 4A:
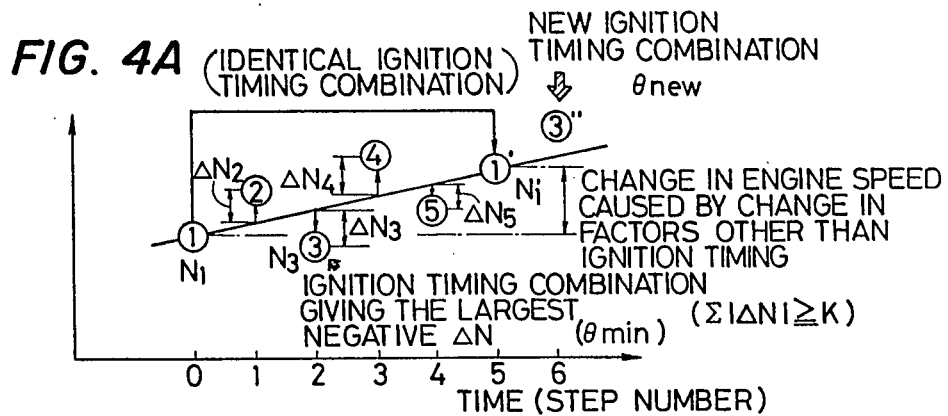
FIGS. 4A to 4D are explanatory diagrams useful for understanding the way of finding the combination of optimum ignition timings of all the cylinders according to the present invention.

Now the method of finding the point "A" will be further described with reference to FIGS. 4A to 4D, taking an example of applying the method to a four-cylinder engine. In FIG. 4A, references ①to ⑤ indicate various ignition timing combinations, while x-distance indicates time or step number, and y-distance indicates the engine speed. Namely, the engine is operated with these combinations ①to ⑤ first, and then the engine is further operated with another combination ①' which is the same as the combination ①. Engine operation for each combination is effected for a predetermined period of time, and it is assumed that six engine speed data N1, N2, N3, N4, N5 and N1' are respectively obtained to obtain a line passing through N1 and N1'. Then a distance from this line to each of the points ②,③,④ and ⑤, which distance is indicative of the the aforementioned difference ΔN, is obtained. After all the differences ΔN are found, the sum of absolute values of the differences, which is expressed in terms of Σ|ΔN| is obtained. Then it is determined whether the sum Σ|ΔN| is greater than a predtermined value K. If Σ|ΔN| is greater than K, a combination causing the largest negative difference ΔN is corrected to another timing. In the illustrated example, since the point ③ gives the largest negative difference −ΔN3, the combination ③ is corrected to a new combination ③' at which a new ignition timing combination $\theta_{new}$ is resulted.

Figure 4B:
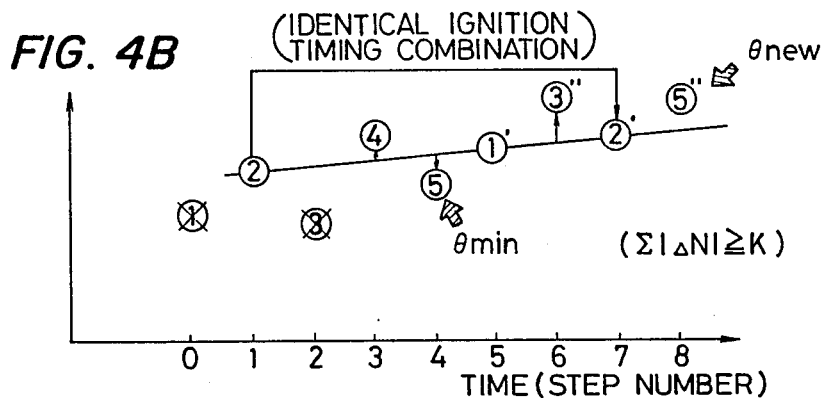

Then as shown in FIG. 4B, the engine is operated with five ignition timing combinations ②,④,⑤,① and ③', and also another combination ②' which is the same as the combination ②. During each operation engine speed data is obtained so that differences ΔN and Σ|ΔN| are respectively obtained in the same manner as described in the above. If the sum Σ|ΔN| is greater than K, the combination ⑤ giving the largest negative difference ΔN, is corrected to a combination ⑤'. In the case that all the differences are positive, a combination giving the lowest engine speed is corrected.

Figure 4C:
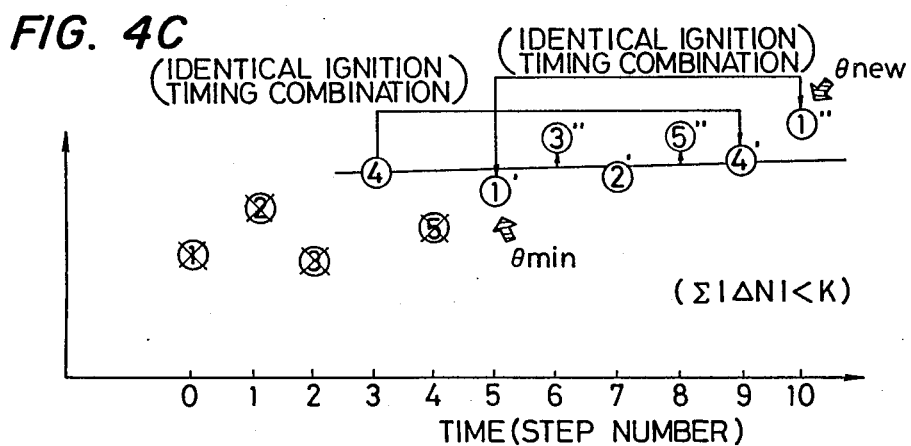

As shown in FIG. 4C, the engine is further operated with ignition timing combinations ④,①',③',②' and ⑤' and also with a combination ④' which is the same as the combination ④. During each operation engine speed data is obtained so that differences $\Delta N$ and $\Sigma|\Delta N|$ are respectively obtained in the same manner as described in the above. Assuming that the sum $\Sigma|\Delta N|$ is smaller than K, the combination ⑤ giving the largest negative difference $\Delta N$ is not corrected, and the engine is operated with a combination ① with which the engine was operated earliest among four ignition timing combinations ①,③',②' and ⑤', and the same operations as the above are repeated. The above method described with reference to FIGS. 4A to 4C is continuously carried out for correcting the ignition timing combination toward the optimum combination point "A". From the above it will be understood that the engine speed variation due to the operation of the accelerator pedeal has been removed before engine speed data are compared with each other, and then ignition timing combination is corrected in a right direction so that engine output increases.

Figure 4D:
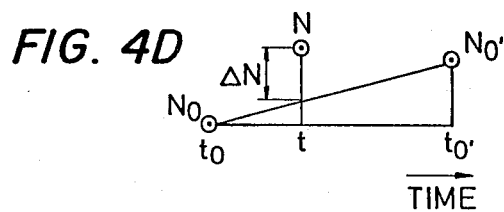

FIG. 4D shows a way of finding each difference $\Delta N$ by way of interpolation. In detail, $\Delta N$ can be obtained by:

$$\Delta N = N - \left[ N_0' - \frac{t_0' - t}{t_0' - t_0} (N_0' - N_0) \right] \quad (3)$$

Figure 5:
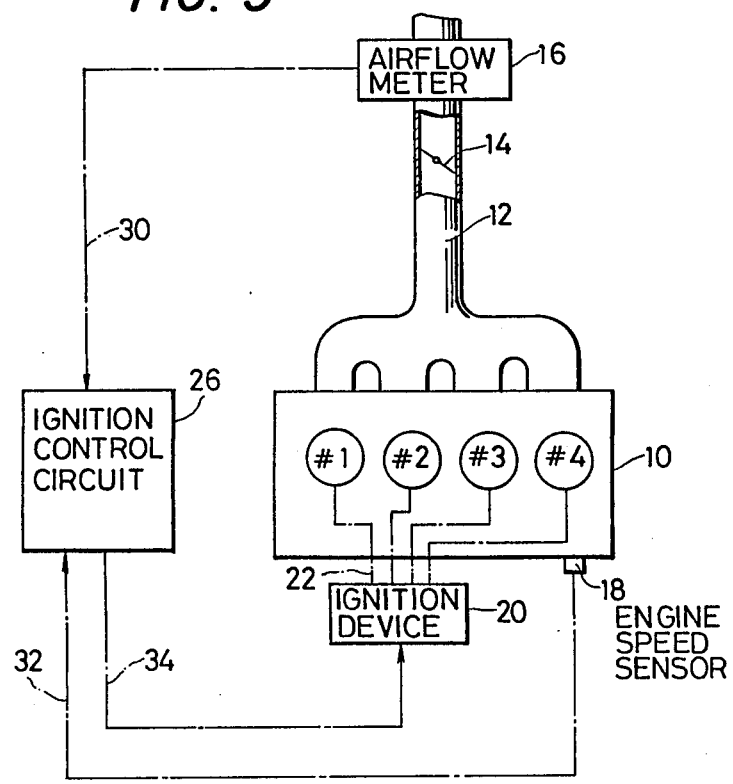
FIG. 5 is a schematic diagram showing the apparatus for controlling igntion timing according to the present invention.

Reference is now made to FIG. 5 which shows apparatus for controlling ignition timing according to the present invention. In FIG. 5, the reference 10 is an internal combustion engine body having four cylinders #1, #2, #3, and #4. Intake air is led to the respective cylinders via an intake manifold 12, where a throttle valve 14 controls the intake airflow. An airflow meter 16 is provided upstream the throttle valve 14 for measuring the intake airflow. This airflow meter 16, however, may be replaced by an intake pressure sensor. The reference 18 is a rotational speed sensor which produces a singal indicative of the revolution of the engine crankshaft. As this rotational speed sensor 18 may be used a well known crankshaft angle sensor which is arranged to produce a pulse singal when the engine crankshaft assumes a given rotational angle.

The reference 20 is an ignition device comprising an ignitor, a distributor, and an ignition coil, which are not shown. The ignition device 20 is connected via conductors 22 (see dot-dash lines) to spark plugs of respective cylinders.

An ignition control circuit 26 is provided to produce actuation signals to be applied to the ignition device 20. The ignition control circuit 26 comprises a computer programmed to execute steps which will be described later. The above-mentioned intake airflow meter 16 and rotational speed sensor 18 are arranged to supply the ignition control device 26 with their output signals via conductors 30 and 32. Thus, the ignition control circuit 26 calculates an ignition timing which is basically determined by the intake airflow and the engine rotational speed represented by the output signals from the airflow meter 16 and the rotational speed sensor 18. The result of this calculation is fed via a conductor 34 to the ignition device 20 so that ignition timing will be controlled.

Figure 6:
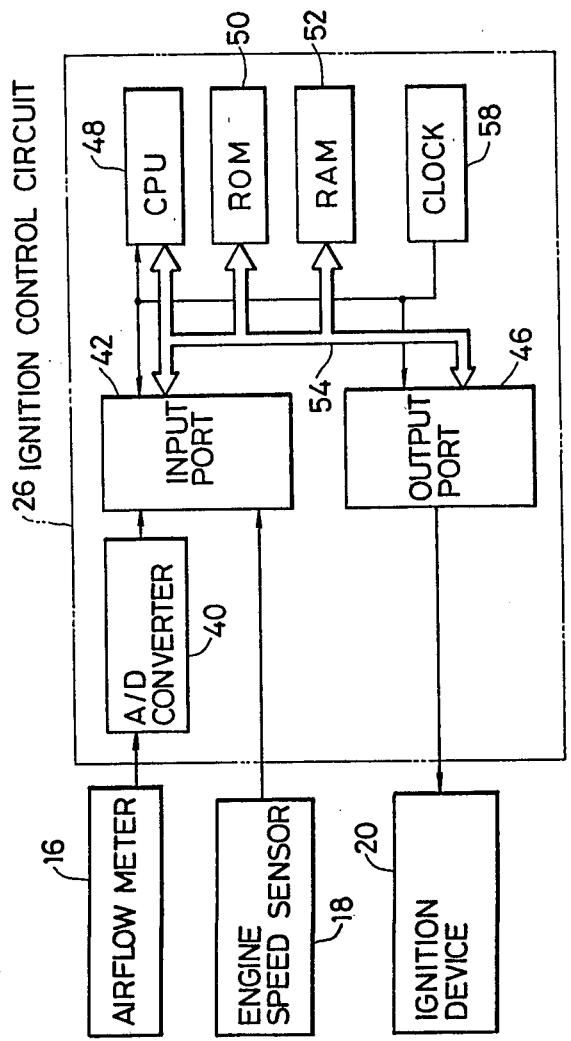
FIG. 6 is a schematic diagram of the ignition control circuit shown in FIG. 5.

FIG. 6 illustrates a block diagram of the ignition control circuit 26 having an A/D converter 40, an input port 42, an output port 46, a CPU 48, a ROM 50, a RAM 52, and a clock generator 58. The input port 42 is used to receive the output signals from the airflow meter 16 and the rotational speed sensor 18. The A/D converter 40 converts an analog signal from the airflow meter 16 or an intake pressure sensor to a digital signal so that the converted digital signal is fed to the input port 42. The output port 46 functions as a signal gate so that the timing of the actuation signal fed to the ignition device 20 will be controlled thereby. The input and output ports 42 and 46 are both connected via a bus 54 to the CPU 48, ROM 50, RAM 52 constituting a computer. Signal transmission between these circuits is effected in synchronism with clock pulses from the clock generator 58.

The ignition control circuit 26 is so programmed that an optimum ignition timing will be obtained for each of the cylinders as described in the above. Although the engine 10 illustrated in FIG. 5 has four cylinders, the operation of the ignition control circuit 26 will be described with reference to FIG. 7, by way of an example of a two-cylinder engine for simplicity.

Figure 7:
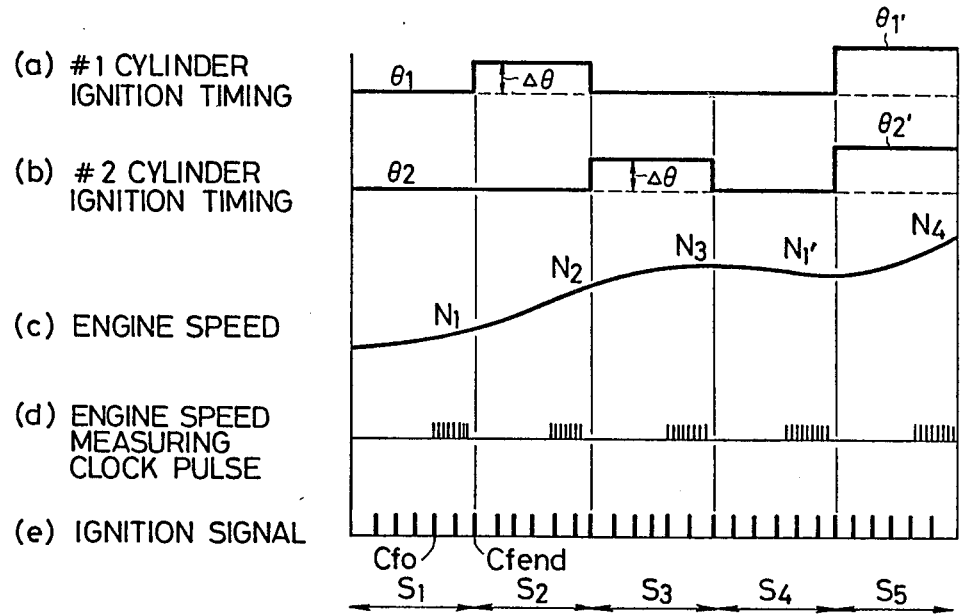
FIG. 7 is a timing chart showing the way of operating process for obtaining an optimum combination of ignition timings according to the present invention.

At the beginning of calculation, namely in a first step S1, the ignition timings of the cylinders are set to $\theta_1$ and $\theta_2$ respectively as shown by (a) and (b) in FIG. 7. Engine operation under these conditions causes a change in the engine rotational speed as shown by (c), while ignition pulses are produced and fed to the spark plugs of the cylinders as shown by (e). The clock pulses between predetermined ignition signals Cfo and Cfend around the end of the first step S1 are taken in so that the number thereof is counted as shown by (d). This number of clock pulses between Cfo and Cfend is regarded as the engine speed N1 at the step S1.

In a followng second step S2, the ignition timing of the first cylinder #1 is changed to $\theta_1 + \Delta\theta$, while the ignition timing of the second cylinder #2 is unchanged. Under this condition the engine is operated for a predetermined period of time so as to measure the engine speed in the same manner as in the first step S1. Namely, the number of clock pulses between Cfo and Cfend in the second step S2 is regarded as the engine rotational speed N2. In this way, another engine speed N3 will be measured in a following third step S3. Furthermore, in a fourth step S4 the engine is operated with ignition timing combiantion equal to that in the first step S1 to derive an engine speed N1'. When the first three combinations of ignition timings are obtained, the average value $\bar{\theta}$ throughout the three combinatios is calculated as described with reference to TABLE and FIG. 3. Simultaneously, one of the three points or combinations, which gives the largest negative difference or the lowest engine speed in the case that all the differences are positive, is determined by using the distance from the line passing through N1 and N1' of FIG. 4A. Namely, ignition timings $\theta_1$ and $\theta_2$ are obtained, and new ignition timings $\theta_1'$ and $\theta_2'$ are found at a point opposite thereto with respect to the average ignition timing combination by computing in accordance with the method of FIG. 3. Then the engine is operated with the new ignition timing combination to derive engine speed data N4 which is obtained as the number of clock pulses. This step is shown as a fifth step S5 in FIG. 7. The above-mentioned largest negative difference or the lowest engine speed in the case that all the differences are positive will be simply referred to as the lowest engine speed only because of the change in ignition timing.

After completion of the fifth step S5, an unshown sixth step S6 is executed in which the engine is operated with an ignition timing combination which is the same as that of the second step S2, to derive an engine speed data N2'. Then a combination giving the lowest engine speed only because of the change in ignition timing is found from three combinations used in the steps S2, S3 and S5. Thus, a new ignition timing comination is found at a point opposite to the combination with respect to the average ignition timing point, and these operations are repeated after this.

The above-described ignition timing control will be further described in detail with reference to a flow chart of FIG. 8. In the illustrated embodiment, ignition timing control is arragned to be executed by an interrupt service routine. Namely, the computer of FIG. 6 is arranged to execute an unshown main routine normally. An interrupt request is arranged to be produced each time the engine crankshaft assumes a predetermined angle so that the interrupt service routine is repeatedly executed whenever the engine operates. When the engine starts, an interrupt request is applied to the computer so that the operational flow enters into the interrupt service routine of FIG. 8 (see step 100). The interrupt service routine comprises various steps as will be described hereinbelow, but these steps in the program should not be confused with the steps S1, S2 . . . SM of FIG. 7.

In a following step 101, a basic ignition timing $\theta_B$ is calculated on the basis of the intake airflow data and the engine speed data both fed from the input port 42 of FIG. 6. This calculation is effected such that a most suitable ignition timing is selected from a map stored in the ROM 50 in accordance with the airflow and engine speed data. Nextly, in a step 102, it is detected whether the engine is in steady state or not by detecting the engine speed and the varying rate of the intake vacuum. If the engine is other than the steady state, the answer of the step 102 is NO so that the operational flow proceeds to a step 103. In this step 103, the count i of a step counter, the count Cf of an ignition number counter, the count np of a clock pulse counter, and a flag KEY are all reset to zero or cleared as i=0, Cf=0, np=0, and KEY=0. In a following step 104, the ignition timings of individual cylinders #1, #2, #3 . . . #M are set as follows:

$$\textcircled{H}_1 = \theta_B + \theta_1 \qquad (4)$$

$$\textcircled{H}_2 = \theta_B + \theta_2$$

$$\vdots$$

$$\textcircled{H}_M = \theta_B + \theta_M$$

wherein $\theta_1, \theta_2 \ldots \theta_M$ are correction amounts of the ignition timing, which amounts are stored in a memory so that one correction amount suitable for the combination of the airflow and engine speed will be selected; and $\theta_B$ is the basic ignition timing or advance angle obtained in the step 101.

After the execution of the step 104, the operational flow returns to the unshown main routine from a step 105.

Turning back to the step 102, when the engine is detected to be in steady state, the answer of the step 102 becomes YES. Then the engine is operated with the combination of ignition timings $\textcircled{H}_1, \textcircled{H}_2 \ldots \textcircled{H}_M$ set as described in the above. Thus, the engine speed is measured. Namely, at the beginning the engine speed at the first point L of FIG. 2, i.e. the engine speed N1 in the first step S1 of FIG. 7, is measured. When the answer of the step 102 is YES, a step 106 takes place in which the count J of an ignition counter is added by one in response to a single ignition. This ignition counter is arranged to be cleared or reset to one when the count J reaches the total number M of the cylinders of the engine 10. To this end the count J is detected to see whether it is greater than the total number M of the cylinders in a step 107, and if J is greater than M, J is reset to one in a step 108. On the other hand, if J is not greater than M, the setp 108 is skipped so that the operational flow goes to a step 109.

In the step 109, ignition timing is obtained for each cylinder by adding a correction amount $\theta_J$ to the basic advance angle $\theta_B$. Namely, since $\theta_J$ assumes $\theta_1, \theta_2 \ldots \theta_M$ as J changes, ignition timings $\textcircled{H}_J$, i.e. $\textcircled{H}_1, \textcircled{H}_2 \ldots \textcircled{H}_M$ will be obtained when the step 109 is executed as many times as the total number M of the cylinders. In a following step 110, the count Cf of the ignition number counter is added by one each time ignition takes place. In a following step 111, it is detected whether the count Cf of the ignition number counter is greater than Cfend shown in FIG. 7. At the very beginning of the engine operation the answer of the step 111 is NO as a matter of course, and thus a step 117 takes place in which it is detected whether Cf is greater than Cfo. If Cf has not yet reached Cfo, the answer of the step 117 assumes NO so that the operational flow returns to the main routine via a step 119. On the other hand, when Cf is greater than Cfo, namely, when entering into the engine speed measuring time between Cfo and Cfend of FIG. 7, a following step 118 is executed in which the count np of the clock pulse counter is added by $\Delta$np. This means that clock pulse counting is started immediately after entering into the engine speed measuring time. After the step 118 the operational flow returns to the main routine via the step 119.

In this way the number of the clock pulses is counted to detect the engine speed. Turning back to the step 111, when the count Cf becomes greater than Cfend, the answer thereof turns to YES, and thus a step 112 takes place. In this step 112, the count np of the clock pulse counter is stored in a memory, i.e. the RAM 52 of FIG. 6. The value of np at this time indicates the engine speed N1 in the step S1 of FIG. 7. In a following step 113, the count Cf and the count np are both reset to zero (Cf=0, np=0), while the count i of the step counter is added by one (i=i+1). This means that the first step S1 of FIG. 7 has been completed and a second step S2 will be executed.

A step 114 follows the step 113 so that it is detected whether the count i is not greater than M. At this time since i=1, and thus the answer of the step 114 is YES so that the operational flow enters into a step 115 in which the correction amount $\theta_1, \theta_2 \ldots \theta_M$ for each cylinder is set as follows:

$$\theta_1 = \theta_1 + \Delta\theta_{11} \qquad (5)$$

$$\theta_2 = \theta_2 + \Delta\theta_{21}$$

$$\theta_M = \theta_M + \Delta\theta_{M1}$$

Although it has been described with reference to FIGS. 2 and 7 that the ignition timing of the first cylinder #1 has been changed as much as $\theta_{11} = \Delta\theta$, while the ignition timing of the second cylinder #2 has been unchanged as $\Delta\theta_{21} = 0$, the value of $\Delta\theta_{21}$ may be other than zero.

After the completion of the step 115, the operational flow returns via a step 116 to the main routine. When the operational flow enters again into the interrupt service routine through the step 100, the steps 106, 107, 109, 110, 111, 117, 118, 119 are executed in the same manner as the above-mentioned first step S1 so that the engine speed N2 in the second step S2 is measured as the number of the clock pulses to be stored in the memory in the step 112. After this, the step 113 takes place to reset the count Cf of the ignition number counter and the count np of the clock pulse counter, while the count i of the step counter is added by one before entering into the third step S3.

In the step 114, the answer is still YES even in the case of a two-cylinder engine. Therefore, the ignition timing correction amounts are set in the following step 115 as follows:

$$\theta_1 = \theta_1 + \Delta\theta_{12} \quad (6)$$
$$\theta_2 = \theta_2 + \Delta\theta_{22}$$
$$\cdot$$
$$\cdot$$
$$\theta_M = \theta_M + \Delta\theta_{M2}$$

After this, the operational flow returns to the main routine through the step 116, and the interrupt service routine will be executed again from the step 100 so that steps following the step 106 are executed in the same manner as before to measure the engine speed N3 in the third step S3. This engine speed data N3 is stored in the form of the pulse count np in the memory in the step 112.

Passing through the step 113, the operational flow enters into the step 114 in which decision of $i \leq M$ is effected. In the case of a two-cylinder engine, the answer of the step 114 becomes NO at this time so that a step 120 takes place. In the step 120, it is detected whether the flag KEY has been set to 0 or not. In this case, since he flag KEY has been set to zero, a step 131 is executed in which the flag KEY 131 is set to 1. Then in a step 132, an amount of correction, which is equal to that of the first combination among respective ignition timing combinations whose engine speeds will be compared, is set. Namely, in this case the amount of correction equals $\theta_1, \ldots \theta_M$ of the step 104, wherein M is 2 in the case of two cylinder engine. After the completion of the step 132, the operational flow returns to the main routine via a step 130.

When the operational flow again reaches the step 120, the answer of the step 120 is now NO because the flag KEY has been set to 1. Therefore, the flag KEY is set to zero in a step 121. Then in a step 122, the differences $\Delta N$, which have been described with reference to FIGS. 4A to 4C, are computed by using the formula (3). In a following step 123, the sum ($\Sigma|\Delta N|$) of absolute values of the differences $\Delta N$ is computed, and then this sum is comapred with the predetermined value K in a step 124 to determine whether the sum is greater than or equal to K. If the determination of the step 124 is YES, a step i=min which gives the largest negative difference $\Delta n$ in engine speed, is found in a step 125. Then a step 126 takes place to calculate the aforementioned average ignition timing $\bar{\theta}$ by using the formula (1).

$$\bar{\theta} = \frac{H + S + L}{3}$$

Since this formula is a vector equation, $\bar{\theta}$ is calculated for each cylinder components of the formulas (4), (5) and (6). Then in a step 127 a new ignition timing combination point is calculated on the basis of the average ignition timing combination point $\theta$ obtained in the step 126, by using the aforementioned formula (2):

$$\theta_{new} = \bar{\theta} - \alpha(\theta_{min} - \bar{\theta})$$

The new ignition timing combination point $\theta_{new}$ is such that it results in increase in engine speed. This formula (2) is also a vector equation, and therefore, calculation is effected for each cylinder component of the formulas (4), (5) and (6).

In a step 128 following the step 127, the ignition timing combination $\theta_{min}$ ($\theta_1, \theta_2 \ldots \theta_M$ in formula (4)) giving the largest negative difference in engine speed data, i.e. N1 in FIG. 2, is replaced with the new ignition timing combination $\theta_{new}$. Then in a followng step 129, ignition timing correction amount is set for each of the cylinders to obtain new $\theta_1, \theta_2 \ldots \theta_M$. After this the operational flow returns to the main routine through the step 130.

Figure 8A:
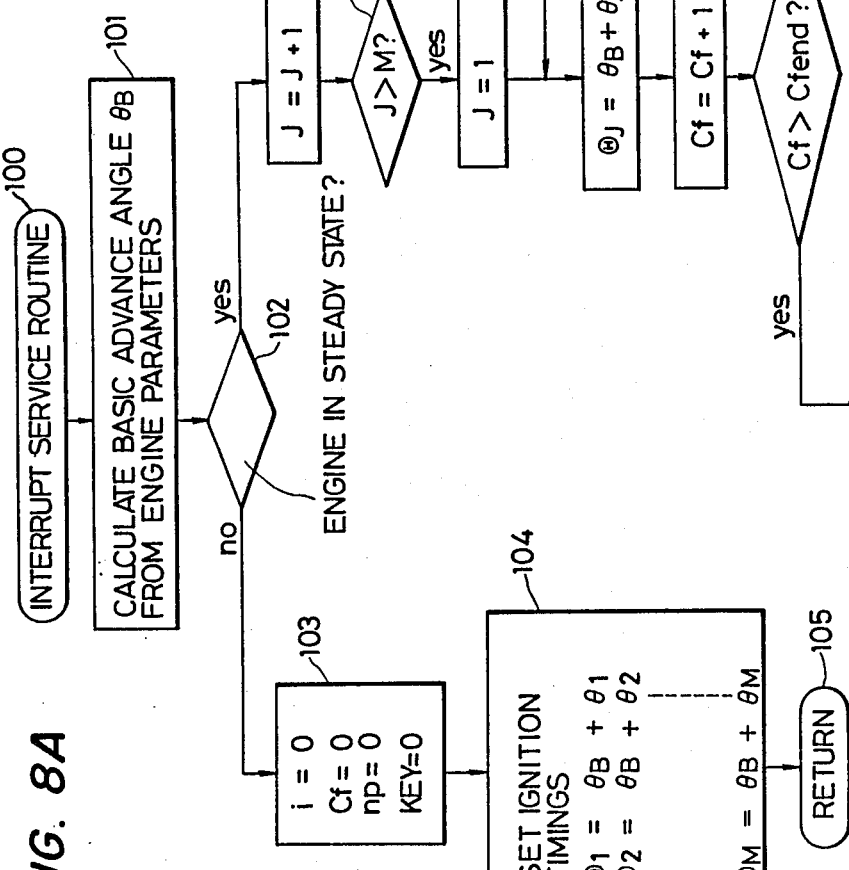
FIG. 8 is a flow chart showing the operational steps executed by the computer included in the ignition timing control circuit of FIG. 6.
Figure 8B:
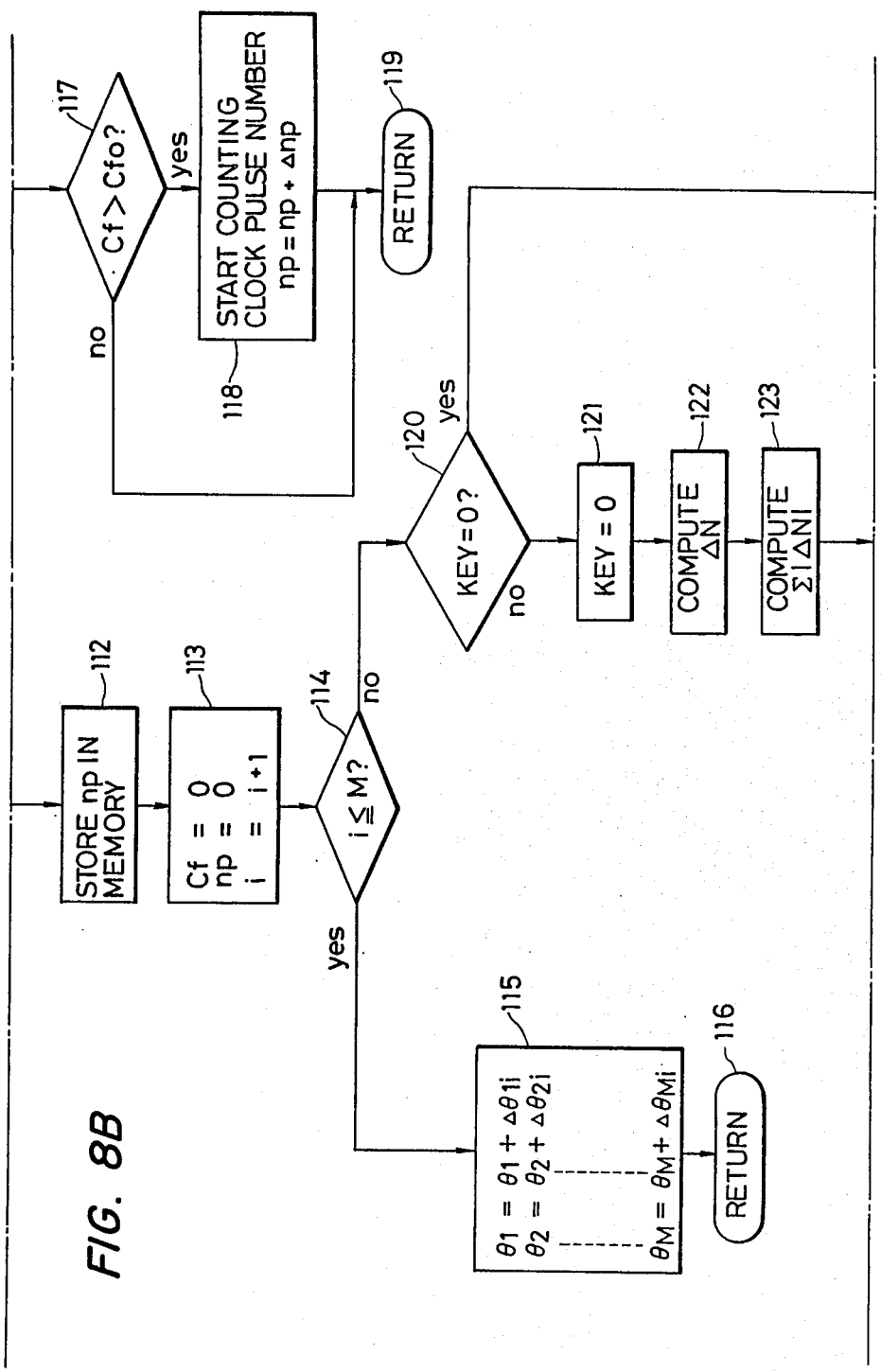
Figure 8C:
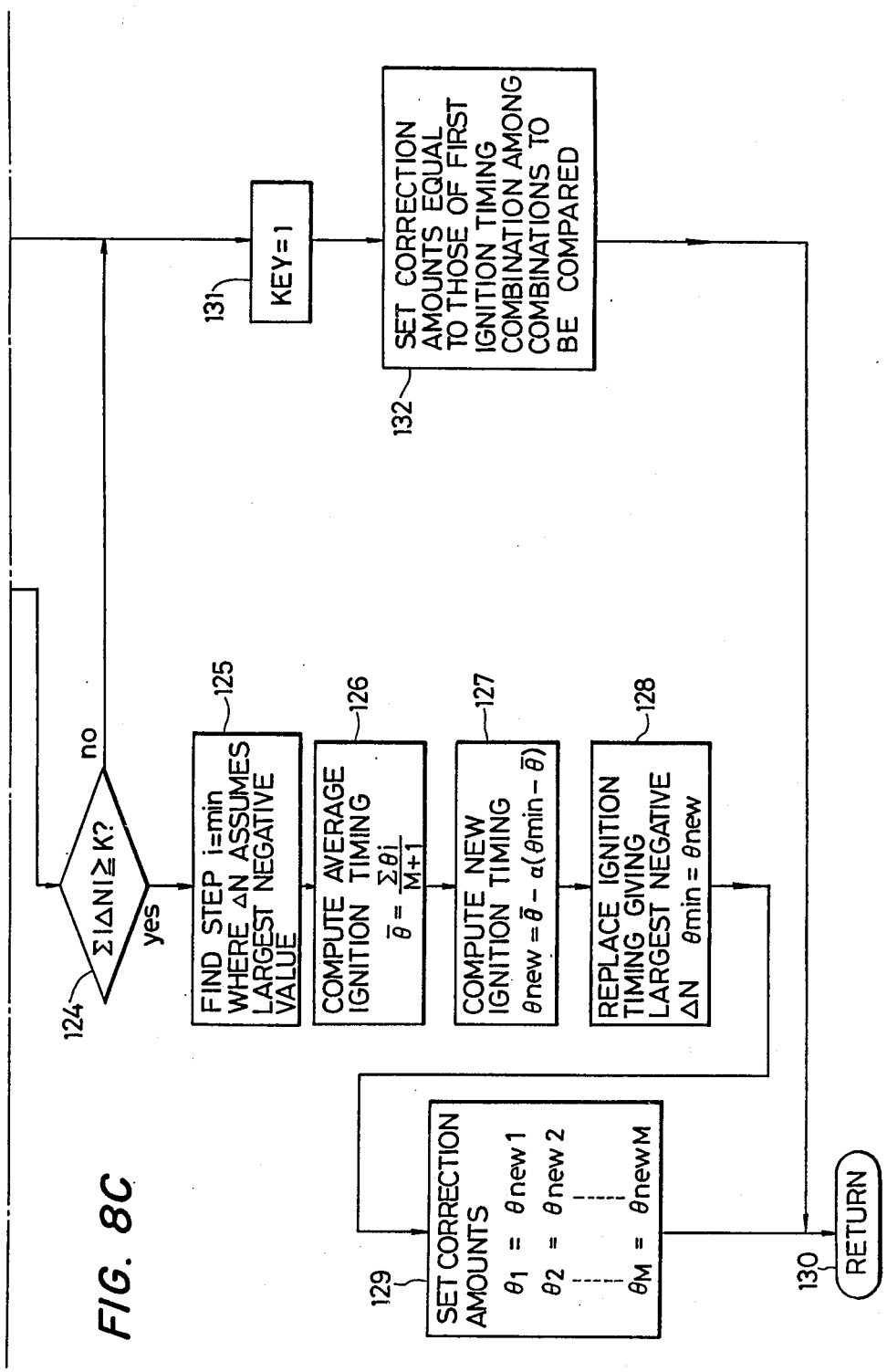

After a new ignition timing combination has been set as described in the above, the fifth step S5 of FIG. 7 is exeucted by the steps 106, 107, 109, 110, 111, 117 and 118 of FIG. 8 so that an engine speed data N4 is measured. Subsequently, the operational flow branches off from the setp 111, to proceeds through the steps 114, 120 and 131 to the step 132 in which a correction amount equal to that in the second step S2 is set to operate the engine, and then an ignition timing combination giving the largest negative difference $\Delta N$ is replaced with another combination which gives a higher engine speed as described in the above. After this similar operations are repeated so that the optimum combination point "A" in FIG. 2 is reached.

At the time that the optimum combination "A" has been reached, the sum $\Sigma|\Delta N|$ is smaller than the predetermined value K in the step 124, and therefore the determination thereof branches off to the step 131. Therefore, the flag KEY is set to 1, and then a correction amount equal to that of the first combination, namely the combination whose engine speed was measured first, among respective ignition timing combinations to be compared, is set in the step 132 prior to returning to the main routine. If the determination in the step 124 continuously results in NO, namely, if the sum $\Sigma|\Delta N|$ is continuously smaller than K, there is no fear that the the ignition timing combination is corrected toward a wrong direction after the optimum combination has been reached.

In the above-described embodiment, although the sum $\Sigma|\Delta N|$ of absolute values of deviations in engine speeds is used to determine whether a new ignition timing combiantion is to be computed or not, this sum may be substituted with an average value as long as it correctly represents a variation in engine speed due to ignition timing change.

Furthermore, the predetermined value K used for determining whether the value indicative of the variation in the differences in engine speed is large or small, may be changed in accordance with one or more engine parameters, such as the engine speed, intake manifold vacuum pressure, or the like.

Figure 9:
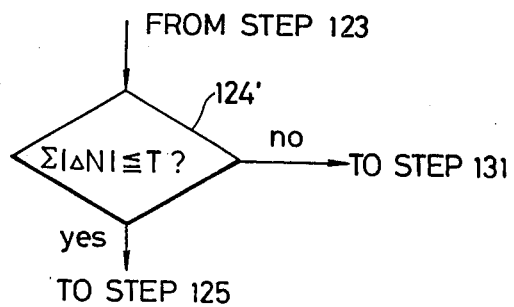
FIG. 9 shows a step which may be used in place of a step included in the flow chart of FIG. 8.

Reference is now made to FIG. 9 showing a step which may be used in place of the step 124 of FIG. 8. The step denoted as 124' is a step for determining whether the sum $\Sigma|\Delta N|$ is smaller than or equal to a predetermined value T. This predetermined value T is set to a value so that it can be determined whether the differences $\Delta N$ in engine speeds are caused by other than the change in ingnition timing, for instance, by the operation of the accelerator pedal. Namely, a value corresponding to a difference which has no chance to be resulted only because of the change in ignition timing, is set as the predetermined value T. When the determinnation of the step 124' results in YES, namely, when the sum $\Sigma|\Delta N|$ is samller than or equal to the predetermined value T, the steps 125 through 129 of FIG. 8 are executed one after another. This means that new comination of ignition timings is set only when it has been detected that the engine speed had not been drastically changed due to external disturbance, such as the change in fuel flow rate.

During the process of finding the optimum ignition timing combination point "A", when any external disturbance caused by the operation of the accelerator pedal or the change in road sufcae condition is applied to the engine, which disturbance is of such a degree that the engine condition is determined as in steady state in the step 102, the value of the sum $\Sigma|\Delta N|$ obtained in the step 123 has a chance to be very large. In the case that the sum $\Sigma\{\Delta N|$ is greater than the predetermined value T, the steps 131 and 132 of FIG. 8 are executed so that a new combination is not set. Namely, a new ignition timing combinination is not set when the engine speed drastically varies due to factors other than the change in ignition timing because a correct replacement of ignition timing combination toward the optimum combination point "A" cannot be expected under such engine condition.

The sum $\Sigma|\Delta N|$ may be replaced with an average value as long as it accurately represents a drastic change in engine speed. Furthermore, the predetermined vlaue T may be changed in accordance with one or more engine parameters in the same manner as described in the above.

The above-described embodiments are just examples of the present invention, and therefore, it will be apparent for those skilled in the art that many modifications and variations may be made without departing from the spirit of the present invention.

What is claimed is:

1. A method of controlling ignition timing in a multicylinder internal combustion engine, comprising the steps of:
   (a) operating said engine with a plurality of combinations of ignition timings of respective cylinders to derive engine output data for each combination in such a manner that said engine is operated for a predetermined period of time with each of said combinations one after another;
   (b) further operating said engine with one of said combinations again for a predetermined period of time to derive further engine output data;
   (c) deriving the difference between the engine output data both obtained from engine operation in twice with an identical ignition timing combination;
   (d) deriving, by using said difference obtained in said step (c), imaginary engine output data which would have been obtained if the engine were operated with said identical ignition timing combination with which said engine has been operated twice;
   (e) deriving the difference between each imaginary engine output data obtained in said step (d) and each engine output data obtained in said step (a);
   (f) deriving a value indicative of the variation throughout the differences obtained in said step (e);
   (g) comparing said value obtained in said step (f) with a predetermined value;
   (h) replacing the ignition timing combination, which gives the largest negative difference or the lowest engine output in the case that all the differences are positive, with a new ignition timing combination when said value has a predetermined relationship with said predetermined value; and
   (i) determining a subsequent ignition timing by using one of said plurality of ignition timings when said value does not have said predetermined relationship with said predetermined value.

2. A method as claimed in claim 1, wherein said value derived in said step (f) is a sum of absolute values of said differences.

3. A method as claimed in claim 1, wherein said value derived in said step (f) is an average value of said differences.

4. A method as claimed in claim 1, wherein said predetermined relationship in said steps (h) and (i) is such that said value is greater than or equal to said predetermined value.

5. A method as claimed in claim 4, wherein said predetermined value is selected so as to represent an engine operating condition where the ignition timing combination is close to an optimum igntionin timing combination at which maximum engine output can be derived.

6. A method as claimed in claim 1, wherein said predetermined relationship in said steps (h) and (i) is such that said value is smaller than or equal to said predetermined value.

7. A method as claimed in claim 6, wherein said predetermined value is selected so as to represent an engine operating condition which has been disturbed drastically.

8. A method as claimed in claim 1, wherein said step of replacing comprising the steps of:
   calculating an average ignition timing $\bar{\theta}$ throughout said various combinations; and
   calculating said new combination $\theta_{new}$ in accordance with the following equation:

$$\theta_{new} = \bar{\theta} - \alpha(\theta_{min} - \bar{\theta})$$

wherein
   $\alpha$ is a constant; and
   $\theta_{min}$ is the ignition timing combination giving the largest negative difference or the lowest engine output in the case that all the differences are positive.

9. A method as claimed in claim 1, wherein the number of said plurality of ignition timing combinations equals the number of cylinders of said engine plus one.

10. A method as claimed in claim 1, wherein said engine output is engine speed.

11. Apparatus for controlling ignition timing in a multicylinder internal combustion engine, comprising:
   (a) first means for producing ignition signals which are respectively fed to spark plugs of the engine cylinders, said first means being capable of producing said ignition signals having different timings from another;
   (b) second means for detecting the engine output;
   (c) third means for detecting engine parameters; and
   (d) fourth means responsive to said second and third means for causing said first means to produce said ignition signals, said fourth means;
   determining a basic ignition timing in view of said engine parameters;
   changing said basic ignition timing so that various combinations of ignition timings are provided for operating said engine with said various ingition timing combinations in such a manner that said engine is operated twice with an identical ignition timing combination;
   deriving the difference between the engine output data both obtained from engine operation in twice with said identical ignition timing combination;
   deriving, by using said difference, imaginary engine output data which would have been obtained if the engine were operated with said identical ignition timing combination with which said engine has been operated twice;
   deriving the difference between each imaginary engine output and each engine output data actually measured;
   deriving a value indicative of the variation throughout the differences each between imaginary engine output data and actually measured data;
   comparing said value with a predetermined value;
   replacing the ignition timing combination, which gives the largest negative difference or the lowest engine output in the case that all the differences are positive, with a new ignition timing combination when said value has a predetermined relationship with said predetermined value; and
   determining a subsequent ignition timing by using one of said plurality of ignition timings when said value does not have said predetermined relationship with said predetermined value.

12. Apparatus as claimed in claim 11, wherein said second means comprises a pulse generator producing a pulse train indicative of the engine speed.

13. Apparatus as claimed in claim 11, wherein said fourth means comprises a computer having a processor and a memory in which ignition timing data are stored, said computer being arranged to execute an interrupt service routine in response to an interrupt request repeatedly generated.

14. Apparatus as claimed in claim 13, wherein said computer comprises means for counting the number of said various combinations so that one of said combinations giving the largest negative difference or the lowest engine ouput is detected when said engine is operated with a predetermined number of said various combinations.

* * * * *